(12) United States Patent
Oren

(10) Patent No.: US 10,021,595 B2
(45) Date of Patent: Jul. 10, 2018

(54) AGGREGATION PROCEDURES FOR A MEDIA ACCESS CONTROL LAYER

(71) Applicant: Intel IP Corporation, Santa Clara, CA (US)

(72) Inventor: Elad Oren, Tel Aviv (IL)

(73) Assignee: INTEL IP CORPORATION, Santa Clara, CA (US)

(*) Notice: Subject to any disclaimer, the term of this patent is extended or adjusted under 35 U.S.C. 154(b) by 31 days.

(21) Appl. No.: 14/963,383

(22) Filed: Dec. 9, 2015

(65) Prior Publication Data

US 2017/0171069 A1    Jun. 15, 2017

(51) Int. Cl.
*H04L 12/28* (2006.01)
*H04W 28/06* (2009.01)

(52) U.S. Cl.
CPC ................. *H04W 28/065* (2013.01)

(58) Field of Classification Search
CPC ..... H04L 45/74; H04L 47/12; H04L 61/6022; H04W 72/04
USPC ........................................................ 370/229
See application file for complete search history.

(56) References Cited

U.S. PATENT DOCUMENTS

| | | | | |
|---|---|---|---|---|
| 2007/0291829 A1* | 12/2007 | Nabetani | ............... | H04L 1/0005 375/219 |
| 2010/0158015 A1* | 6/2010 | Wu | ......................... | H04L 49/90 370/395.7 |
| 2011/0019557 A1* | 1/2011 | Hassan | ............. | H04W 28/0215 370/252 |
| 2014/0254424 A1* | 9/2014 | Gao | ...................... | H04L 1/0003 370/254 |
| 2015/0351110 A1* | 12/2015 | Bai | ................... | H04W 28/0247 370/329 |

* cited by examiner

*Primary Examiner* — Andrew Chriss
*Assistant Examiner* — Ellen Kirillova
(74) *Attorney, Agent, or Firm* — Viering, Jentschura & Partner mbB

(57) ABSTRACT

A radio communication device includes a wireless transmission circuit and a control processing circuit adapted to interact with the wireless transmission circuit to transmit and receive wireless signals, the control processing circuit configured to perform a Media Access Control process including selecting a packet aggregation size based on a channel quality metric of a wireless channel and a payload transmission efficiency metric of the wireless channel, electing one or more packets based on the packet aggregation size, and generating a single Media Access Control aggregated header and encapsulating the one or more packets with the single Media Access Control aggregated header, the wireless transmission circuit configured to transmit the one or more packets and the single Media Access Control aggregated header via the wireless channel.

11 Claims, 6 Drawing Sheets

| PER_MSDU | x (AMSDU size) |
|---:|---:|
| 13% | 7.180706 |
| 15% | 6.153129 |
| 17% | 5.366834 |
| 19% | 4.745611 |
| 21% | 4.242279 |
| 23% | 3.82607 |
| 25% | 3.476059 |
| 27% | 3.177521 |
| 29% | 2.919791 |
| 31% | 2.694955 |
| 33% | 2.497019 |
| 35% | 2.321355 |
| 37% | 2.164336 |
| 39% | 2.023078 |
| 41% | 1.895258 |
| 43% | 1.778983 |
| 45% | 1.672697 |
| 47% | 1.575105 |
| 49% | 1.485124 |
| 51% | 1.401837 |
| 53% | 1.324464 |
| 55% | 1.252336 |
| 57% | 1.184876 |
| 59% | 1.121582 |

AGGREGATION PROCEDURES FOR A MEDIA ACCESS CONTROL LAYER

TECHNICAL FIELD

Various embodiments relate generally to aggregation procedures for a media access control layer.

BACKGROUND

Each layer of the WiFi protocol stack may receive a Service Data Unit (SDU) from an upper layer and subsequently perform layer-specific processing on the SDU in order to generate a Physical Data Unit (PDU) to provide to a lower layer. Such layer-specific processing may include header encapsulation of payload data, where a counterpart protocol layer at the end receiving end may utilize the header to properly interpret the payload data.

However, the header encapsulation process may increase overhead by attaching header data to the layer payload, thus reducing throughput. Accordingly, protocol stack layers such as the MAC layer may apply aggregation procedures in order to encapsulate multiple PDUs and/or SDUs with a single layer header, which may as a result reduce overhead and increase throughput.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows an exemplary lookup table for use in the method of FIG. 4;

DESCRIPTION

Figure 1:
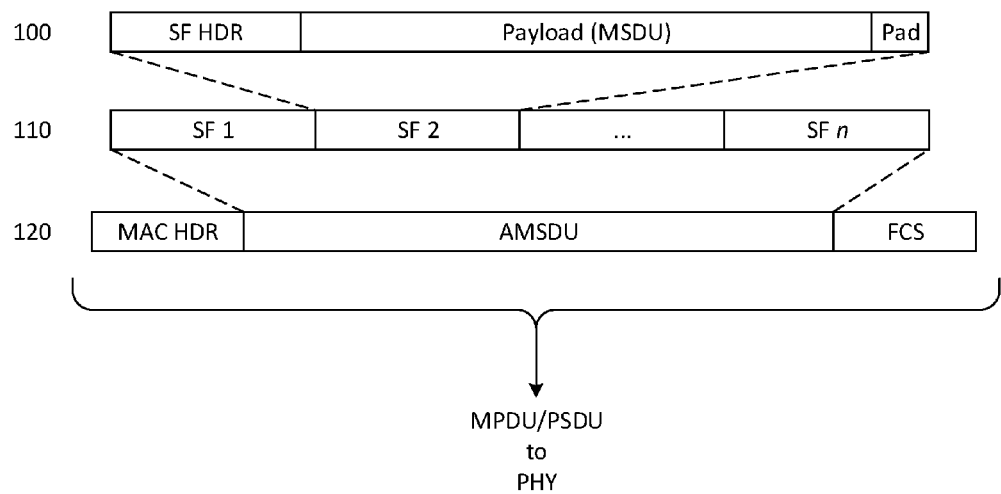
FIG. 1 shows an Aggregated Media Access Control Service Data Unit (AMSDU) procedure.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects.

The terms "group", "set", "collection", "series", "sequence", "grouping", "selection", etc., and the like in the description and in the claims, if any, are used to refer to a quantity equal to or greater than one, i.e. one or more.

As used herein, a "circuit" may be understood as any kind of logic implementing entity (analog or digital), which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. Accordingly it is understood that references to a "circuit" may refer to two or more circuits that collectively form a single circuit.

A "processing circuit" (or equivalently "processing circuitry") as used herein is understood as referring to any circuit that performs an operation on a signal or signals, such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

It is appreciated that the following description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced (LTE-A), CDMA, WCDMA, LTE-A, General Packet Radio Service (GPRS), Enhanced Data Rates for GSM Evolution (EDGE), High Speed Packet Access (HSPA), HSPA Plus (HSPA+), and other similar radio communication technologies.

The term "network" as utilized herein, e.g. in reference to a communication network such as a mobile communication network, encompasses both an access component of a network (e.g. a radio access network (RAN) component) and a core component of a network (e.g. a core network component).

As utilized herein, the term "radio idle mode" or "radio idle state" used in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the terms "transmit" and "send" encompass both direct and indirect transmission/sending. Similarly, the term "receive" encompasses both direct and indirect reception unless explicitly specified.

A Media Access Control (MAC) layer in a WiFi protocol stack may apply data unit aggregation in order to encapsulate multiple Service Data Units (SDUs) and/or Physical Data Units (PDUs) in a single header. Such MAC aggregation procedures may increase throughput by reducing the ratio of overhead to payload data.

A given protocol layer may receive SDUs from an upper layer and perform layer-specific processing on each received SDU to produce a PDU to provide to a lower layer. In the context of a MAC layer in a WiFi protocol stack, the MAC layer may receive a MAC SDU (MSDU) from the Logical Link Control (LLC) layer and, after performing MAC-layer processing, may provide a MAC PDU (MPDU) to the physical (PHY) layer. Conventionally, a MAC layer may perform MAC header encapsulation on an MSDU received from the LLC to generate an MPDU to provide to the PHY layer for PHY-layer processing and subsequent transmission. Each PSDU received by the PHY may thus include a MAC header, which may be characterized as overhead.

In order to reduce this overhead and consequently increase throughput, a MAC layer may employ the aforementioned MAC aggregation procedures. In an Aggregated MSDU (AMSDU) scheme, the MAC may aggregate multiple MSDUs into a single MPDU (thus encapsulating multiple MSDUs with a single MAC header) and provide the resulting AMSDU to the PHY layer as an MPDU (PSDU from the perspective of the PHY layer). Alternatively, in an Aggregated MPDU (AMPDU) scheme the MAC may first encapsulate each MSDU with a MAC header to generate an MPDU and subsequently aggregate multiple MPDUs into an AMPDU to provide to the PHY layer. A MAC layer may also perform both AMPDU and AMSDU in combination, which may include aggregating multiple MSDUs into an AMSDU, generating an MPDU from each AMSDU, and aggregate each MPDU together as an AMPDU.

FIG. 1 shows an illustration of an AMSDU procedure as performed by a MAC layer. The MAC layer may first receive an MSDU from an upper layer, e.g. an LLC layer (the sublayer above the MAC in Layer 2/Data Link layer). The MAC may first generate an AMSDU subframe by affixing a subframe header at stage 100, which may include a Sender Address (SA), Destination Address (DA), and a payload length field, and subsequently padding the data unit to a predefined boundary length.

The MAC may identify additional MSDUs that have the same SA and RA and equivalently generate AMSDUs subframes with these MSDUs. As shown at stage 110, the MAC may then append the AMSDU subframes to one another to generate and AMSDU. The MAC may then perform MAC header encapsulation by prepending the AMSDU with a MAC header in and appending a Frame Check Sum (FCS) to the AMSDU at stage 120.

The MAC may then provide the resulting MPDU to the PHY layer, which may subsequently perform PHY layer processing including header encapsulation with a Packet Layer Convergence Protocol (PLCP) header at the PLCP PHY sublayer to generate a PPDU for subsequent provision to the Physical Medium Dependent (PMD) PHY sublayer.

Accordingly, as opposed to the regular (non-aggregated) procedure of encapsulating each MSDU with a MAC header, AMSDU may append a single MAC header to multiple MSDUs. While such may reduce overhead due to the decreased ratio of header to payload data, each AMSDU may only include one error check field (e.g. FCS) as shown at stage 120. Accordingly, AMSDUs received at a receiving end may only be able to perform an error check (such as Cyclic Redundancy Check (CRC)) on the entire AMSDU. As the receiving end may not be able to identify a single MSDU at which the error originated, the receiving end may instead need to request retransmission of the entire AMSDU, which may be subsequently handled by the transmitting end MAC layer. Consequently, excessive retransmissions may significantly affect throughput due to the required retransmission of the entire AMSDU. Furthermore, the Packet Error Rate (PER) for AMSDUs may be higher compared to regular MSDUs due to the comparably larger packet size, and accordingly high PERs may be observed for AMSDU in low link quality conditions.

Figure 2:
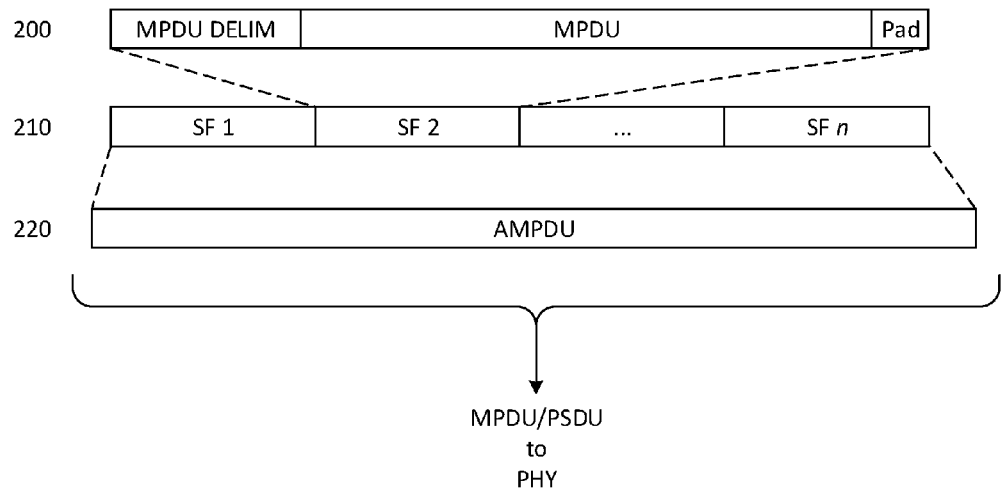
FIG. 2 shows an Aggregated Media Access Control Physical Data Unit (AMPDU) procedure.

FIG. 2 shows an illustration of an AMPDU procedure as performed by a MAC layer. In contrast to AMSDU, the MAC layer in an AMPDU scheme may encapsulate each MSDU with a MAC header and FCS to generate an MPDU before performing any MAC aggregation. The MAC may then attach an MPDU delimiter and pad each MPDU to generate an AMPDU subframe in 210. The MAC may then aggregate multiple AMPDU subframes in 210 to generate the AMPDU in 220 to be provided to the PHY layer as an MPDU/PSDU.

Accordingly, each AMPDU subframe in an AMPDU may have an individual CRC and FCS as the MAC layer encapsulates each MSDU to generate an MPDU before AMPDU aggregation. As a result, the receiving end may be able to individually perform an error check on each MSDU (i.e. each AMPDU subframe), and therefore may request individual retransmissions of specific AMPDU subframes as opposed to being limited to requesting retransmission of the entire AMSDU in an AMDSDU aggregation scheme. AMPDU may thus be more suitable in poor link quality scenarios in which retransmissions are common, but may nevertheless require comparably more overhead than AMSDU due to the individual header encapsulation of each MSDU.

Accordingly, AMSDU may be better suited to strong channel conditions where the probability of retransmission (i.e. PER) is low, as the MAC layer may be able to reduce overhead by encapsulating multiple MSDUs with a single MAC header without having to perform excessive costly retransmissions of the entire AMSDU. The overhead reduction may as a result improve throughput. While aggregating higher quantities of MSDUs in an AMSDU may increase throughput (by decreasing overhead caused by higher ratios of header data), larger AMSDU packets may be more prone to error due to the greater amount of data being transmitted. As even a single error may subsequently require retransmission of the entire AMSDU, the use of large AMSDU packets may result in unsatisfactory throughput in low channel quality conditions characterized by high PER.

Due to this dependence of throughput on PER and AMSDU size, a MAC layer may optimize AMSDU performance by making an intuitive selection for AMSDU size (i.e. how many MSDUS to aggregate into a single AMSDU) based on the channel conditions. Specifically, a MAC layer may analyze a channel PER metric, such as a measured PER for regular MSDU transmission, and select an appropriate AMSDU size in order to maximize throughput. As will be detailed, higher MSDU PER values may warrant smaller AMSDU sizes while lower MSDU PER values may warrant greater AMSDU sizes. A MAC layer may additionally consider the current wireless transmission rate (utilized by the PHY layer for wireless transmission) for AMSDU size selection, as the ratio of overhead (header) to payload may vary depending on the PHY rate.

Figure 3:
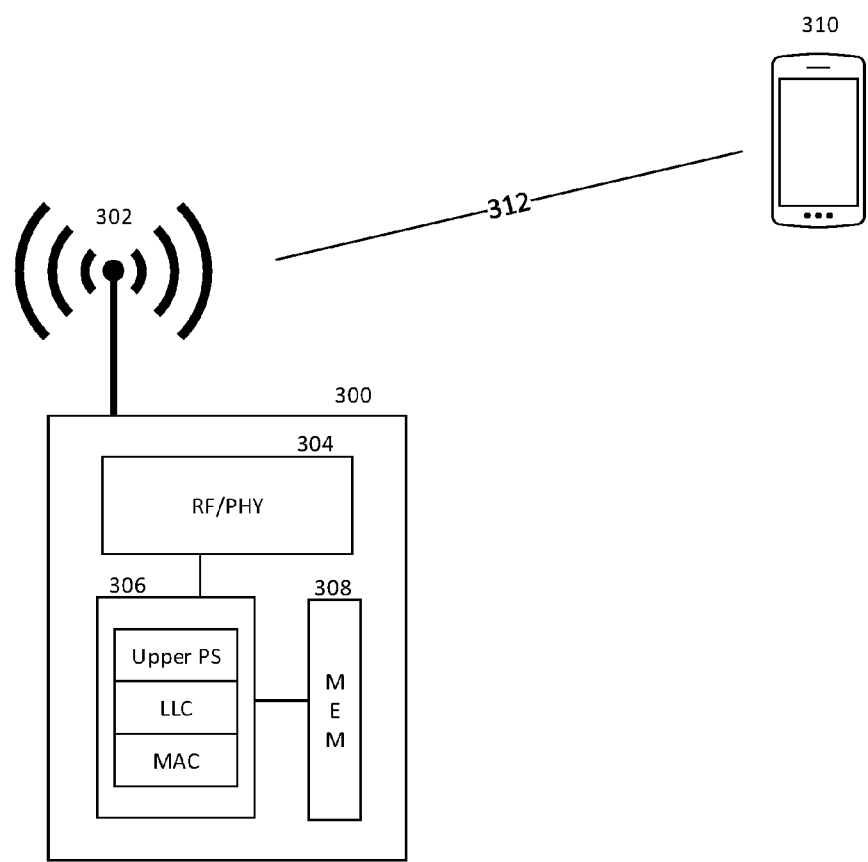
FIG. 3 shows an internal configuration of a radio communication device.

FIG. 3 shows a block diagram illustrating an internal configuration of radio communication device 300. Radio communication device 300 may be configured to operate on a WiFi network, and may be either a network access point or an end terminal device. Accordingly, it is understood that the implementations detailed herein may be applied at either end of a WiFi communication path, and may thus be employed in router-to-device communications, device-to-router communications, or device-to-device communications (such as e.g. tethering).

As shown in FIG. 3, radio communication device 300 may include antenna system 302, Radio Frequency (RF)/PHY processing circuit 304, control processing circuit 306, and memory 308. Although not shown in FIG. 3, radio communication device 300 may also include host device components, such as a CPU configured to run an operating system of a host side of radio communication device 300, and additional radio communications components for one or more further radio access technologies (e.g. additional RF circuits, PHY circuits, control circuits, etc.). Radio communication device 300 may include additional hardware, software, or firmware elements including processors/microprocessors, controllers/microcontrollers, memory, other specialty or generic hardware/processors/circuits, etc. Radio communication device 300 may also include a variety of user input/output devices (display(s), keypad(s), touch-screen(s), speaker(s), external button(s), camera(s), microphone(s), etc.), peripheral device(s), memory, power supply, external device interface(s), subscriber identify module(s) (SIM) etc. While only the communication As will be detailed, in an aspect of the disclosure radio communication device may include a wireless transmission circuit (RF/PHY processing circuit 304) and a control processing circuit (control processing circuit 306) adapted to interact with the wireless transmission circuit to transmit and receive wireless signals. The control processing circuit may be configured to perform a Media Access Control process including selecting a packet aggregation size based on a channel quality metric of a wireless channel and a payload transmission efficiency metric of the wireless channel, electing one or more packets based on the packet aggregation size, and generating a single Media Access Control aggregated header and encapsulating the one or more packets with the single Media Access Control aggregated header. The wireless transmission circuit may be configured to transmit the one or more packets and the single Media Access Control aggregated header via the wireless channel.

In another aspect of the disclosure, radio communication device may include a wireless transmission circuit (RF/PHY processing circuit 304) and a control processing circuit (control processing circuit 306) adapted to interact with the wireless transmission circuit to transmit and receive wireless signals. The control processing circuit may be configured to select an Aggregated Media Access Control Service Data Unit (AMSDU) packet size according to a channel quality metric of a wireless channel and a payload transmission efficiency metric of the wireless channel, select one or more packets according to the packet aggregation size, and encapsulate the one or more packets with an AMSDU header according to an AMSDU packet aggregation scheme. The wireless transmission circuit may be configured to transmit the one or more packets and the AMSDU header via the wireless channel.

In an abridged overview of the operation of radio communication device 300, control processing circuit 306 may be configured to control operation of radio communication device 300 for purposes of radio communication. Control processing circuit 306 may be configured to configured as a WiFi driver, and may be configured to execute a WiFi protocol stack in order to support communication links with one or more additional radio communication devices. Control processing circuit 306 may thus be a microprocessor configured to retrieve program code that defines protocol software and/or firmware modules from memory 308 and execute the program code in order to operate according to the protocol stack. Control processing circuit 306 may thus be configured to execute various arithmetic, logical, control, and input/output (I/O) operations defined as instructions by the program code.

Although RF/PHY processing circuit 304 is shown as a single component in FIG. 3, RF/PHY processing circuit 304 may be composed of two separate components, such as e.g. an RF front end circuit (RF) and a modem circuit (PHY). Control processing circuit 306 may be configured to control RF/PHY processing circuit 304 and antenna system 302 (directly or indirectly) to receive and transmit wireless signals with one or more further radio communication devices over a wireless communication network. Specifically, antenna system 302, which may be a single antenna or an antenna array composed of a plurality of antennas, may receive radio frequency signals and provide the radio frequency signals to RF/PHY processing circuit 304, which may be configured to perform radio frequency and baseband processing (e.g. according to an RF front end and modem, respectively) on the received radio frequency signals including frequency mixing, amplification, analog-to-digital conversion (ADC), demodulation/decoding, digital signal processing, etc., on the received radio frequency signals. RF/PHY processing circuit 304 may provide resulting communication data to control processing circuit 306 for protocol stack-layer processing. Conversely, control processing circuit 306 may provide communication data to RF/PHY processing circuit 304 for radio frequency and baseband processing prior to radio frequency transmission via antenna system 302, which may include frequency mixing, amplification, digital-to-analog conversion (DAC), modulation/encoding, digital signal processing, etc., at RF/PHY processing circuit 304 in order to prepare the communication data for wireless transmission as radio frequency signals. RF/PHY processing circuit 304 may be composed of various analog, digital, and mixed circuitry components configured to process radio frequency and baseband signals accordingly.

Control processing circuit 306 may thus control the communication operations of radio communication device 300 as specified by the protocol stack, which may include the MAC and LLC sublayers (Layer 2, also referred to as the data link layer) in addition to upper layers (Layer 3 and above). As previously indicated, control processing circuit 306 may operate according to instructions defined in program code retrieved from memory 308. Control processing circuit 308 may thus be configured to establish and realize communication links with one or more further radio communication devices according to the control logic provided by the control stack.

As shown in FIG. 3, in an exemplary scenario radio communication device 300 may be configured to transmit and receive wireless communication data with peer communication device 310 (which may be any arbitrary peer device for purposes of explanation and may be either a network access point or end terminal device). Control processing circuit 306 may thus be configured to realize a communication link over wireless channel 312 according to the layer-specific protocols of each protocol stack layer. In addition to the respective layer-specific processing of Layers 3 and above, control processing circuit 306 may execute LLC- and MAC-layer processing before providing MPDUs to the PHY section of RF/PHY processing circuit 304 for subsequent PHY-layer processing (composed PLCP and PMD sublayer processing to append a preamble, PHY header, and modulate the communication data according to a modulation scheme and PHY rate).

As detailed regarding FIG. 1 and FIG. 2, the MAC layer (a MAC software module realized on control processing circuit 306) may receive MSDUs from the LLC layer (an LLC software module implemented on control processing circuit 306) and perform MAC header encapsulation to provide an MPDU to the PHY layer (the PHY section of RF/PHY processing circuit 304, which may be hardware and software).

As opposed to performing MAC header encapsulation on each MSDU, control processing circuit 306 may instead aggregate multiple MSDUs into an AMSDU with a single MAC header as detailed with respect to FIG. 1. By decreasing the header to payload (MSDU data) ratio with AMSDU aggregation, control processing circuit 306 may reduce overhead and increase throughput.

Control processing circuit 306 may need to select an AMSDU size for AMSDU aggregation, where the AMSDU size defines the total quantity of MSDUs that are aggregated into a single AMSDU packet. As previously introduced, the effectiveness of AMSDU aggregation with respect to throughput may vary based on channel quality and PHY rate. For example, if wireless channel 312 has poor channel quality (i.e. a high BER/PER), control processing circuit 306 may need to retransmit a high percentage of AMSDU packets to peer communication device 310 due to the increased likelihood that each relatively large AMSDU packets will contain at least one error. Furthermore, peer communication device 310 may not be able to perform error checks on each MSDU in the AMSDU (as AMSDU provides only a single CRC/FCS as opposed to a CRC/FCS for each MSDU in AMPDU), and accordingly may need to request retransmission of the entire AMSDU. Throughput may thus be relatively poor due to both the high retransmission rate and the significant amount of data that needs to be retransmitted for each retransmission, and accordingly control processing circuit 306 may be best suited to select a small AMSDU size or utilize regular MSDU.

Conversely, if wireless channel 312 has strong channel quality (i.e. a low BER/PER), control processing circuit 306 may increase throughput by selecting a large AMSDU size. As the PER will be low, control processing circuit 306 may only need to retransmit a small number of AMSDU packets, which may be offset in terms of throughput by the overhead savings resulting from the reduced MAC header data needed for AMSDU.

Control processing circuit 306 may additionally consider the current PHY rate (the transmission rate utilized by the PHY section of RF/PHY processing circuit 204) in AMSDU size selection. As will be detailed, control processing circuit 306 may transmit (via RF/PHY processing circuit 306) the MSDU and MAC header of an AMSDU according to the PHY rate while additionally appending multiple overhead sequences to the AMSDU that each transmitted with a constant time regardless of PHY rate. As the duration of these "constant" overhead sequences are not affected by the PHY rate, high PHY rates may result in the constant overhead sequences assuming a large portion of the overall AMSDU transmission time due to the shorter payload data transmission (according to the high PHY rate), and accordingly control processing circuit 306 may be better suited to utilize large AMSDU size in order to offset some of the negative effects on throughput of the high ratio of constant overhead sequences to payload data. Conversely, low PHY rates may result in a higher ratio of payload data transmission time to constant overhead sequence transmission time (e.g. as the MSDU and MAC header will be transmitted over a longer duration of time according to a low PHY rate), and the throughput improvement benefits of AMSDU may consequently be diminished.

Accordingly, due to the dependency of throughput on both channel quality and PHY rate, control processing circuit 306 may be configured to evaluate the current channel quality (e.g. characterized by PER) and PHY rate in order to select an effective AMSDU size to optimize throughput at the MAC layer. As the PER and/or PHY rate may differ depending on the destination peer communication device of the AMSDU packet, control processing circuit 306 may be configured to select an AMSDU size for each peer communication device. Control processing circuit 306 may additionally be able to dynamically adjust the AMSDU size over time according to variations in channel quality and/or PHY rate.

As previously detailed, AMSDU may not be effective in poor channel quality conditions due to the increased probability that the relatively large AMSDU packets will contain at least one error compared to the smaller regular MSDU packets.

For example, given a BER probability b (the probability that any given bit will fail), the probability of success may be denoted as 1−b. For a packet of length B bytes, the probability (given as the packet error rate) PER that the packet will contain no errors is thus $$\overline{PER} = (1-b)^{8B}, \quad (1)$$

as the probability of success 1−b for any given bit is independently distributed over all 8B bits of the packet.

Similarly, the probability PER that the packet will contain error is given as $$PER = 1 - (1-b)^{8B}. \quad (2)$$

Accordingly, control processing circuit 306 may calculate the corresponding estimated throughput given the PER for an AMSDU packet in order to select an AMSDU size that produces the optimal throughput. However, BER may not conventionally be available at most WiFi drivers (e.g. control processing circuit 306), which instead may monitor retransmissions via received acknowledgements (ACKs) in order to obtain the PER. Accordingly, control processing circuit 306 may collect PER statistics for regular MSDU packets (which may additionally include effects of collisions from hidden terminals, although such may not substantially affect the accuracy of the collected PER) and subsequently utilize the collected MSDU PER to estimate the AMSDU PER. For example, control processing circuit 306 may extract an estimated BER from the MSDU PER, and apply the estimated BER in order to estimate the AMSDU PER.

Specifically, control processing circuit 306 may collect the MSDU packet error rate $PER_{MSDU}$ for MSDU packets of length L bytes, and estimate the BER as b (by re-arranging Equation (2) with L) as $$b = 1 - (1 - PER_{MSDU})^{\frac{1}{8L}}. \quad (3)$$

Control processing circuit 306 may then apply BER estimate b to estimate the packet error rate $PER_{AMSDU}$ for an AMSDU packet of length B as $$\begin{aligned} PER_{AMSDU} &= 1 - (1-b)^{8B} \quad (4) \\ &= 1 - 1 - \left(1 - \left[1 - (1 - PER_{MSDU})^{\frac{1}{8L}}\right]\right)^{8B} \\ &= 1 - (1 - PER_{MSDU})^{\frac{8B}{8L}} \\ &= 1 - (1 - PER_{MSDU})^{\frac{B}{L}}. \end{aligned}$$

Accordingly, the PER for AMSDU packets $PER_{AMSDU}$ is dependent only on $PER_{MSDU}$ and the ratio of B to L, which is equivalent to the number of MSDUs contained within the AMSDU. The ratio B/L may be denoted as x=B/L, where x thus gives the AMSDU size. The possible values of x may depend on the particular WiFi standard that is utilized by radio communication device 300, such as e.g. $x \in [1, 2, \ldots, 5]$ for IEEE (Institute of Electrical and Electronics Engineers) 802.11n and $x \in [1, 2, \ldots 7]$ for IEEE 802.11ac.

Control processing circuit 306 may therefore estimate the AMSDU packet error rate as $PER_{AMSDU}$ based on the PER observed for MSDU packets $PER_{MSDU}$ in order to select an AMSDU size x that will maximize the throughput. The throughput TPT for AMSDU may be given as $$TPT = \frac{D_{payload}}{T_{overall}}, \quad (5)$$

where $D_{payload}$ is the total amount of data (e.g. in bytes, kilobytes, megabytes, etc.) in the transmitted payload and $T_{overall}$ is the overall time required to successfully transmit the AMSDU containing the $D_{payload}$ data. From the perspective of the MAC layer, the payload data may be the MSDU packets contained in the AMSDU aggregated packet (as denoted in FIG. 1). The remaining data that is not MSDU packets, including the subframe header, pad, MAC header, and FCS, may thus be considered overhead from the perspective of the MAC layer.

The overall AMSDU transmission time $T_{overall}$ may include retransmissions, and accordingly may be calculated as the single AMSDU transmission time (which also includes a contribution from retransmissions) multiplied by the number of retransmissions required before successful receipt of the AMSDU by peer communication device 310. As will be later detailed, the number of retransmissions may be assumed as the expected number of retransmissions according to the estimated AMSDU packet error rate $PER_{AMSDU}$.

Control processing circuit 306 may thus need to consider the single AMSDU transmission time $T_{AMSDU}$ and the expected number of AMSDU retransmissions to determine the overall AMSDU transmission time $T_{overall}$. The single AMSDU transmission time $T_{AMSDU}$ may for a Very High Throughput (VHT) AMSDU be given as $$T_{AMSDU} = T_{Backoff} + T_{training} + T_{SIG} + T_{HTSIG} + T_{HTTraining} + T_{Service} + T_{MACHeader} + xT_{MSDU} + T_{Tail}, \quad (6)$$

where $T_{Backoff}$ is the average back-off time, $T_{Training}$ is the Non-HT (High Throughput)/Legacy short training sequence duration plus the Non-HT/Legacy long training sequence duration, $T_{SIG}$ is the Non-HT/Legacy SIGNAL field duration, $T_{HTSIG}$ is the HT SIGNAL field duration, $T_{HTTraining}$ is the first HT SIGNAL field duration, T Service is the service time, $T_{MACHeader}$ is the MAC Header time, x is the AMSDU size as previously introduced, $T_{MSDU}$ is the transmission time of a single MSDU, and $T_{Tail}$ is the tail time.

In accordance with AMSDU, only $T_{MACHeader}$ and $T_{MSDU}$ are dependent on the rate of transmission, i.e. the PHY rate. Accordingly, a high PHY rate will decrease $T_{MACHeader}$ and $T_{MSDU}$ while a low PHY rate will increase $T_{MACHeader}$ and $T_{MSDU}$. Conversely, the remaining overheads $T_{Backoff}$, $T_{Training}$, $T_{SIG}$, $T_{HTSIG}$, $T_{HTTraining}$, $T_{service}$, and $T_{Tail}$ may be the aforementioned "constant" overhead sequences that assume respective constant values regardless of the PHY rate.

As there is only one MAC header per x MSDU packets, the MAC header may be negligible when evaluating the single AMSDU transmission time $T_{AMSDU}$ and the overall AMSDU transmission time $T_{overall}$. As a result, the single AMSDU transmission time $T_{AMSDU}$ expressed in Equation (6) may be approximated as $$T_{AMSDU} \approx T_{overhead} + xT_{MSDU} = Y + \frac{x \cdot L}{r}, \quad (7)$$

where $T_{overhead}$ and Y denote the transmission time of the constant overhead sequences, L is the size of a single MSDU in bytes, and r is the PHY rate.

As previously indicated, the overall AMSDU transmission time $T_{overall}$ is dependent on the single AMSDU transmission time $T_{AMSDU}$ and the number of retransmissions. The number of retransmissions may be assumed as the expected number of retransmissions according to the PER, i.e. $PER_{AMSDU}$, and accordingly the overall AMSDU transmission time $T_{overall}$ may be estimated (i.e. as an expected overall AMSDU transmission time) as the product of the single AMSDU transmission time $T_{AMSDU}$ and the expected number of retransmissions.

The expected number of retransmissions may be determined by modeling the transmission procedure as a geometric probability function, which gives the probability that the first occurrence of success will occur at the k-th independent trial given a probability of failure p for each independent trial, i.e. that k−1 successive failures will occur before the first success at trial k. The probability $P_k$ that the k-th trial is the first success may be given as $$P_k = p^{k-1}(1-p), \quad (8)$$

where the expected value E(k) of k is given as $$E(k) = \frac{1}{1-p}. \quad (9)$$

Analogously, a transmission procedure will be composed of a certain number of initial failures (retransmissions) and a final success, where the probability of failure of each transmission may be given as the packet error rate. Substituting in the AMSDU packet error rate $PER_{AMSDU}$, the expected number of retransmissions (analogous to E(k)) for a given AMSDU packet is given as $$\frac{1}{1-PER_{AMSDU}}.$$

Given the expected number of retransmissions, the overall transmission time $T_{overall}$ may be given as $$T_{overall} = T_{AMSDU} \cdot \frac{1}{1-PER_{AMSDU}}, \quad (10)$$

and consequently the throughput TPT from Equation (5) may be rewritten as $$TPT = \frac{(1-PER_{AMSDU}) \cdot D_{payload}}{T_{AMSDU}}. \quad (11)$$

Substituting the results for $PER_{AMSDU}$ and $T_{AMSDU}$ from Equations (4) and (7) and payload length $D_{payload} = L \cdot x$ (product of AMSDU length and AMSDU size) into Equation (11) yields $$TPT = \frac{\left(1 - \left[1 - (1-PER_{MSDU})^{\frac{B}{L}}\right]\right) \cdot D_{payload}}{T_{AMSDU}}. \quad (12)$$

$$= \frac{(1-PER_{MSDU})^x \cdot L \cdot x}{Y + \frac{x \cdot L}{r}}$$

Control processing circuit 306 may consider the relationship supplied by Equation (12) in selection of an AMSDU size x to optimize throughput. As expressed in Equation (12), throughput may depend on the variable terms $PER_{MSDU}$ (the MSDU packet error rate), x, and r in addition to the static terms Y (constant overhead sequences) and L (MSDU size in bytes).

The ratio of payload transmit time to overhead transmit time may vary depending on the current PHY rate r, where as previously detailed the overhead time Y may remain constant regardless of r and the payload transmission time $$\frac{x \cdot L}{r}$$

may be inversely proportional to r. This ratio of payload transmit time to overhead transmit time may denoted quantified as MAC efficiency μ, where low PHY rates may yield high MAC efficiency μ as the transmission time of the constant overhead sequences may be minute or negligible compared to transmission of the payload at a low PHY rate. In contrast, high PHY rates may yield low MAC efficiency μ as the constant overhead sequences may take up a large portion of the transmission time compared to the relatively brief payload transmission time as a high PHY rate.

Figure 4:
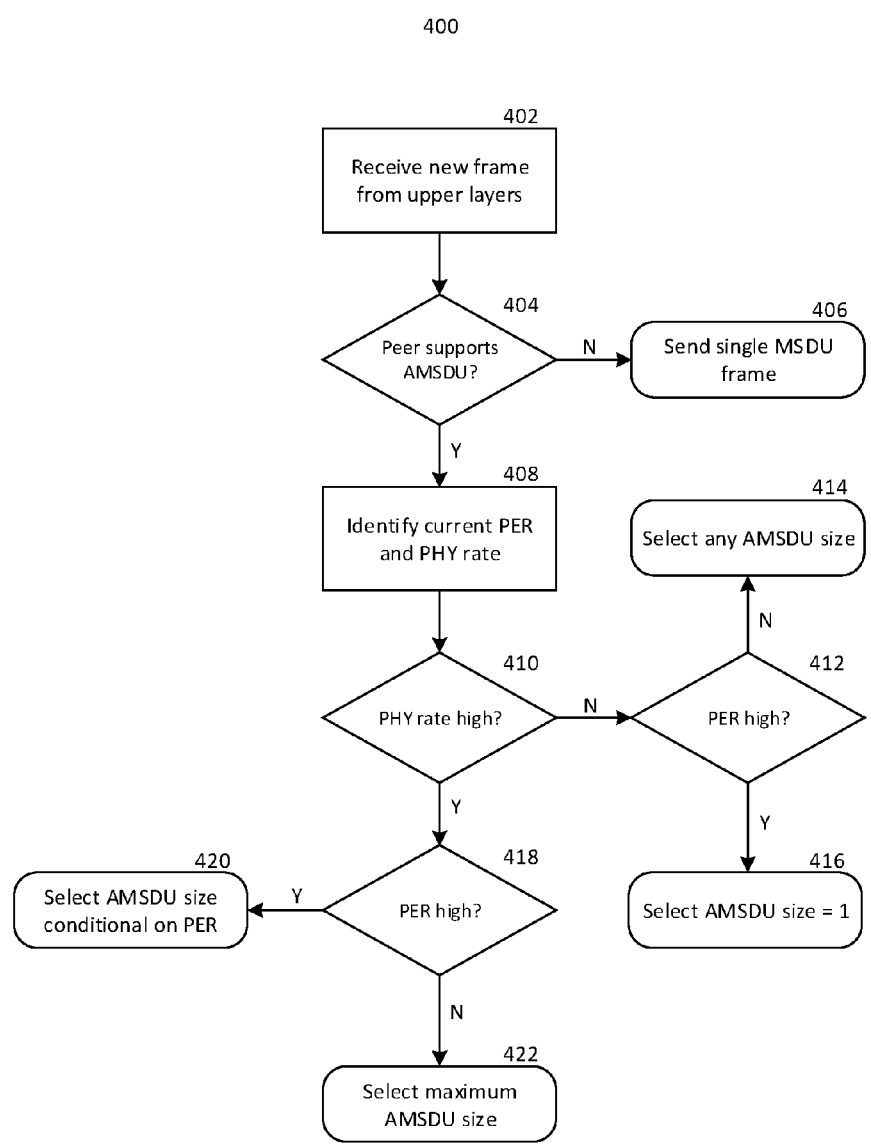
FIG. 4 shows a method for selecting an aggregated packet size according to channel quality and transmission rate.

Due to the multi-variable dependency of throughput on each of $PER_{MSDU}$, x, and r, control processing circuit 306 may consider both the current $PER_{MSDU}$ and r in selection of AMSDU size x. As previously detailed, high values for $PER_{MSDU}$ may warrant small AMSDU size x and vice versa for low values of $PER_{MSDU}$. Furthermore, high PHY rates (corresponding to low MAC efficiency μ) may warrant large AMSDU size x to offset the excessive overhead transmission time relative to payload transmission time and vice versa for low PHY rates (high MAC efficiency μ). Control processing circuit 306 may therefore evaluate both $PER_{MSDU}$ and μ (inversely proportional to r) to select x to maximize throughput. As previously detailed, control processing circuit 306 may have $PER_{MSDU}$ readily available via retransmission statistics but may not have $PER_{AMSDU}$ and/or the BER b available, and thus may utilize $PER_{MSDU}$ to evaluate throughput in accordance with Equation (12). Control processing circuit 306 may apply the following selection criteria to select AMSDU size x:

a. High μ (low PHY rate r), low $PER_{MSDU}$: any AMSDU size x b. High μ (low PHY rate r), high $PER_{MSDU}$: small AMSDU size x c. Low μ (high PHY rate r), low $PER_{MSDU}$: large AMSDU size x d. Low μ (high PHY rate r), high $PER_{MSDU}$: select AMSDU conditional on $PER_{AMSDU}$ FIG. 4 shows a flow chart illustrating method 400 for selecting AMSDU size in accordance with a-d introduced above. Control processing circuit 306 may execute method 400 as MAC layer control logic provided by program code retrieved from memory 308, and accordingly may be configured to perform the requisite arithmetic, logical, control, and I/O operations according to method 400.

In 402, the MAC layer of control processing circuit 306 may receive a new data frame from upper layers, such as by receiving an MSDU from the LLC layer at the MAC layer. The MSDU may be destined for a specific peer device, such as e.g. peer communication device 310 in the exemplary scenario of FIG. 4. Control processing circuit 306 may then determine at 404 whether peer communication device 310 supports AMSDU and, if not, may send the MSDU as a single MSDU frame in 406. Accordingly, control processing circuit 306 may perform MAC layer header encapsulation of the MSDU and provide the resulting MPDU to the PHY section of RF/PHY processing circuit 204 for PHY layer (PLCP and PMD) and radio frequency processing transmission.

If peer communication device 310 does support AMSDU, control processing circuit 306 may proceed to analyze the current $PER_{MSDU}$ and PHY rate r in order to select an AMSDU size. As previously indicated, wireless drivers may have the PER for single MSDU transmission $PER_{MSDU}$ available via retransmission statistics, and control processing circuit 306 may therefore obtain the current $PER_{MSDU}$, which may include retrieving the $PER_{MSDU}$ value and/or calculating $PER_{MSDU}$ from retransmission statistics. Control processing circuit 306 may additionally retrieve the PHY rate r currently being utilized by RF/PHY processing circuit 304, or may calculate the current MAC efficiency μ if control processing circuit 306 is configured to utilize MAC efficiency as the selection criteria for AMSDU size x.

Control processing circuit 306 may accordingly identify the current $PER_{MSDU}$ and PHY rate x of the communication link with peer communication device 310 in 408, i.e. the $PER_{MSDU}$ and PHY rate r of wireless channel 312. Control processing circuit 306 may then determine in 410 if the PHY rate r is high (or equivalently if the MAC efficiency μ is low), which may involve comparing the PHY rate r identified in 408 with a PHY rate threshold (or equivalently the MAC efficiency μ with a MAC efficiency threshold). For example, control processing circuit 306 may characterize μ>90% as "strong" MAC efficiency and μ<50% as "poor" MAC efficiency. Control processing circuit 306 may thus select a MAC efficiency threshold for the comparisons of 410, such as e.g. 50%, 60%, 70%, 80%, 90%, and compare the current MAC efficiency μ to the selected MAC efficiency threshold to determine whether the MAC efficiency μ is "high" (and conversely if the PHY rate r is "low"). Control processing circuit 306 may alternatively utilize a PHY rate threshold that represents an equivalent or similar MAC efficiency, which may depend on the particular values of Y and L.

If control processing circuit 306 determines in 410 that the PHY rate r is high (MAC efficiency μ is low), control processing circuit 306 may proceed to 412 to evaluate whether $PER_{MSDU}$ is high. Similarly to as detailed above, control processing circuit 306 may compare $PER_{MSDU}$ to a PER threshold in order to determine whether $PER_{MSDU}$ is characterized as "high", where generally $PER_{MSDU}=1\%$ may be low, $PER_{MSDU}=10\%$ may be high, and $PER_{MSDU}=30\%$ may be very high. Accordingly, control processing circuit 306 may employ a PER threshold e.g. between 1% and 10% as the criteria in 412 to determine whether $PER_{MSDU}$ is high. Control processing circuit 306 may then proceed to 414 or 416 based on whether control processing circuit 306 determines that $PER_{MSDU}$ is high or not in 412.

In the event that the PHY rate r is low (MAC efficiency μ is high) in 410, Y from Equation (12) may be approximated as Y≈0 as the overhead will be negligible compared to the payload. Equation (12) may thus be approximated as $$TPT \approx \frac{(1-PER_{MSDU})^x \cdot L \cdot x}{\frac{x \cdot L}{r}} = r \cdot (1-P)^x. \quad (13)$$

Accordingly, given a low $PER_{MSDU}$, $(1-PER_{MSDU})^x$ may be approximated as $(1-PER_{MSDU})^x \approx 1$. As a result, the throughput approximated by Equation (13) may not be meaningfully affected by selection of x. Control processing circuit 306 may thus select any AMSDU size x in 414 if the PHY rate r is low (410) and $PER_{MSDU}$ is low (412).

Conversely, given a high $PER_{MSDU}$, the term $(1-PER_{MSDU})^x$ is a fraction. The throughput as given in Equation (13) may thus decrease as x increases. Control processing circuit 306 may thus maximize the throughput by selecting the minimum AMSDU size x in 416, i.e. x=1, if PHY rate r is low (410) and $PER_{MSDU}$ is high (412).

In the event that the PHY rate r is high (MAC efficiency μ is low) in 410, the overhead term Y may not be considered negligible as in 412-414. Control processing circuit 306 may thus first determine in 418 whether $PER_{MSDU}$ is high in 418 in order to subsequently select an AMSDU size x to maximize throughput. Control processing circuit 306 may utilize a $PER_{MSDU}$ threshold similar to as detailed for 412 to determine whether $PER_{MSDU}$ is high in 418.

If r is high and $PER_{MSDU}$ is low (422), $(1-PER_{MSDU})^x$ may be approximated as $(1-PER_{MSDU})^x \approx 0$ and the term $$\frac{x \cdot L}{r}$$

may be approximated as $$\frac{x \cdot L}{r} \approx 0.$$

The throughput as given in Equation (12) may thus be rewritten as $$TPT = \frac{(1 - PER_{MSDU})^x \cdot L \cdot x}{Y + \frac{x \cdot L}{r}} \approx \frac{L \cdot x}{r} \quad (14)$$

Accordingly, the throughput will be linear with respect to AMSDU size x. Control processing circuit 306 may therefore select the maximum AMSDU size x in 422 if r is high (410) and $PER_{MSDU}$ is low (422) in order to optimize throughput. As the maximum AMSDU size x may vary depending on the particular IEEE 802.11 standard utilized, control processing circuit 306 may select the maximum AMSDU size x permitted by the standard in 422, such as e.g. x=5 for IEEE 802.11n, x=7 for IEEE 802.11ac, etc.

Conversely, if r is high and $PER_{MSDU}$ is high (420), the term $$\frac{x \cdot L}{r}$$

may similarly be approximated as $$\frac{x \cdot L}{r} \approx 0$$

although no such approximation of $(1-PER_{MSDU})^x$ is appropriate. Equation (12) thus becomes $$TPT = \frac{(1 - PER_{MSDU})^x \cdot L \cdot x}{Y + \frac{x \cdot L}{r}} \approx \frac{L \cdot x}{Y} \cdot (1 - PER_{MSDU})^x. \quad (15)$$

As L and Y are static, control processing circuit 306 may consider the AMSDU size x that maximizes the term $x \cdot (1-PER_{MSDU})^x$, which is maximized for an x that given as $$x = -\frac{1}{\ln(1 - PER_{MSDU})}. \quad (16)$$

Accordingly, control processing circuit 306 may select the optimum AMSDU size x to maximize throughput in 420 based on the current $PER_{MSDU}$. As x must take an integer value (integer-valued quantity of the number of MSDUs aggregated into each AMSDU), control processing circuit 306 may accordingly calculate x according to Equation (16) and select the closest integer value to the calculated x in 420. As will be detailed below, control processing circuit 306 may alternatively utilize a lookup table in order to reduce processing requirements.

Following selection of AMSDU size of x in one of 414, 416, 420, or 422, control processing circuit 306 may apply the selected x in order to perform AMSDU aggregation. As detailed with respect to FIG. 1, control processing circuit 306 may obtain x MSDUs (with matching SA and RA fields), generate x AMSDU subframes, and encapsulate the x AMSDU subframes together with a MAC header and FCS. Control processing circuit 306 may then provide the AMSDU as an MPDU/PSDU to the PHY section of RF/PHY processing circuit 304. Control processing circuit 306 may additionally perform AMPDU in combination with the AMSDU procedure detailed above by appending an MPDU delimiter to each of a set of generated AMSDUs and aggregating the resulting MPDUs together into an AMPDU to provide to the PHY section of RF/PHY processing circuit 304.

Control processing circuit 306 may therefore select an optimum AMSDU size x depending on the current PHY rate r and $PER_{MSDU}$ and apply the selected AMSDU size x in order to transmit AMSDU packets to peer communication device 310. Control processing circuit 306 may periodically re-evaluate the PHY rate r and $PER_{MSDU}$ based on updated values, and accordingly may re-select an AMSDU size x (if necessary) in one of 414, 416, 420, or 422 during a repeated AMSDU size selection procedure. Control processing circuit 306 may be additionally be configured to consider past r and $PER_{MSDU}$ values during updated selection, such as by averaging and/or weighting past r and $PER_{MSDU}$ values. Furthermore, it is noted that the "comparison order" of r and $PER_{MSDU}$ in 410, 412, and 418 is arbitrary, and may be switched (e.g. PER high in 410 and PHY rate high in 412 and 418) with no effect.

In summary, control processing circuit 306 may calculate x in method 400 as follows:

$$x = \begin{cases} 1, & \text{high } PER, \text{ high } \mu, \\ \text{any}, & \text{low } PER, \text{ high } \mu, \\ \left\lfloor -\frac{1}{\ln(1 - PER_{MSDU})} \right\rceil, & \text{high } PER, \text{ low } \mu, \\ x_{max}, & \text{low } PER, \text{ low } \mu, \end{cases} \quad (17)$$

where $x_{max}$ is the highest AMSDU size permitted dependent on the IEEE 802.11 standard and $\lfloor \cdot \rceil$ denotes the nearest integer function (which may additionally be bounded to $x \in \{1, 2, \ldots, x_{max}\}$). Control processing circuit 306 may determine $$\left\lfloor -\frac{1}{\ln(1 - PER_{MSDU})} \right\rceil$$

as a calculation or from a lookup table such as lookup table 500.

Equation (17) may also be expressed using threshold criteria for PER and µ (or r). Applying PER threshold $TH_{PER}$ and MAC efficiency threshold $TH_\mu$, control processing circuit 306 may calculate x in method 400 as $$x = \begin{cases} 1, & PER > TH_{PER}, \mu > TH_\mu, \\ \text{any}, & PER < TH_{PER}, \mu > TH_\mu, \\ \left\lfloor -\frac{1}{\ln(1 - PER_{MSDU})} \right\rceil, & PER > TH_{PER}, \mu < TH_\mu, \\ x_{max}, & PER < TH_{PER}, \mu < TH_\mu, \end{cases} \quad (18)$$

Control processing circuit 306 may utilize either $PER_{MSDU}$ or $PER_{AMSDU}$ for PER (which may each warrant a different threshold $TH_{PER}$), or may alternatively utilize b. Similarly, control processing circuit 306 may alternatively utilize r in place of μ by utilizing a corresponding PHY rate threshold $TH_r$ and respectively switching high μ/low μ to low r/high r or $μ>TH_μ/μ<TH_μ$ to $r<TH_r/r>TH_r$. Prior calibration may be beneficial in threshold selection for optimized performance.

It is noted that modified AMSDU size selection criteria may be employed that similarly consider packet error rate and MAC efficiency/PHY rate. For example, control processing circuit 306 may utilize an equation to calculate x that uses more or less "piecewise" conditions, which may include a continuous equation that provides a selection for x given all PER and r values. In such a modification, control processing circuit 306 may replace 410-422 with a single process in which control processing circuit 306 calculates x directly from PER and r using a continuous equation for x. Regardless, control processing circuit 306 may select x based on the observed packet error rate and PHY rate.

Alternative to employing a calculation to determine x, control processing circuit 306 may alternatively utilize a lookup table (e.g. stored in memory 308) in order to select x directly based on $PER_{MSDU}$. Accordingly, control processing circuit 306 may utilize $PER_{MSDU}$ as an input to the lookup table in order to determine the AMSDU size x to maximize the throughput as expressed in Equation (15). As the possible values of x may be constrained by the employed standard, a lookup table may be a convenient mechanism for control processing circuit 306 to reduce calculations.

For example, control processing circuit 306 may employ an IEEE 802.11ac standard which allows AMSDU size $x \in [1, 2, \ldots, 7]$. Accordingly, control processing circuit 306 may utilize a lookup that contains the x values for different $PER_{MSDU}$ values according to Equation (16). FIG. 5 shows an exemplary lookup table 500, which gives the AMSDU size x for various different $PER_{MSDU}$ values. As $PER_{MSDU} > 10\%$ may be considered "high" in 418, lookup table 500 may only contain $PER_{MSDU}$ above 10%. Control processing circuit 306 may thus utilize a lookup table similar to lookup table 500 to minimize the necessary calculation to determine x from $PER_{MSDU}$. As x is constrained to integer values, control processing circuit 306 may additionally need to quantize the x value supplied by the lookup table in order to obtain an integer value within the permitted AMSDU size values.

Control processing circuit 306 may alternatively utilize a set of $PER_{MSDU}$ thresholds in a similar capacity as to lookup table 500, such as by assigning a set of $PER_{MSDU}$ thresholds where every pair of $PER_{MSDU}$ thresholds defines an AMSDU size "region" and each region is assigned a specific integer-valued x consistent with the optimal AMSU size x for $PER_{MSDU}$ values within the AMSDUD size region (i.e. falling between the pair of $PER_{MSDU}$ thresholds). Control processing circuit 306 may then compare the observed $PER_{MSDU}$ to the set of thresholds to determine which pair of thresholds the observed $PER_{MSDU}$ value falls between and subsequently select the assigned x value as the AMSDU size. Control processing circuit 306 may therefore either calculate x from $PER_{MSDU}$ according to Equation (16) or utilize a lookup table to select a value for x based on the observed $PER_{MSDU}$. Alternatively, control processing circuit 306 may alternatively utilize AMSDU packet error rate $PER_{AMSDU}$ or BER b instead of $PER_{MSDU}$ in method 400 (for threshold decisions in 412/418 and calculation/lookup table to determine x) if control processing circuit 306 has $PER_{AMSDU}$ or b available.

Furthermore, while method 400 as detailed above specifies a two-criteria decision for AMSDU size x in both $PER_{MSDU}$ and PHY rate r, control processing circuit 306 may be configured to utilize only one of $PER_{MSDU}$ or PHY rate r in method 400. For example, control processing circuit 306 may be configured to select larger AMSDU sizes x for low MAC efficiency μ (or equivalently high PHY rate r) in order to counteract the excessive presence of header data compared to payload data, or may be configured to select larger AMSDU sizes x for low $PER_{MSDU}$ and/or smaller AMSDU sizes x for high $PER_{MSDU}$. However, due to the dependency of throughput on both PER and PHY rate, control processing circuit 306 may significantly improve performance by considering both PER and PHY rate in selection of AMSDU size x.

Additionally, control processing circuit 306 may use an alternative channel quality metric instead of PER in the decision criteria for method 400 (412 and 418), such as another signal quality and/or signal power metric that quantifies the wireless channel with the peer destination device (e.g. wireless channel 312 with peer communication device 310). For example, control processing circuit 306 may evaluate such alternative channel quality metrics to determine whether the wireless channel has strong or poor channel quality, which may ultimately be indicative of the packet error rate and resulting throughput. PER may nevertheless be most relevant for predicting packet errors.

Furthermore, control processing circuit 306 may configured to independently handle communications with multiple peer devices according to method 400. As each peer device may have a unique wireless channel and configuration, each peer device may consequently have a unique PER and PHY rate. Accordingly, control processing circuit 306 may observe and consider the unique PER and PHY rate for each peer device according to the method 400 in order to transmit data to each peer device.

Figure 6:
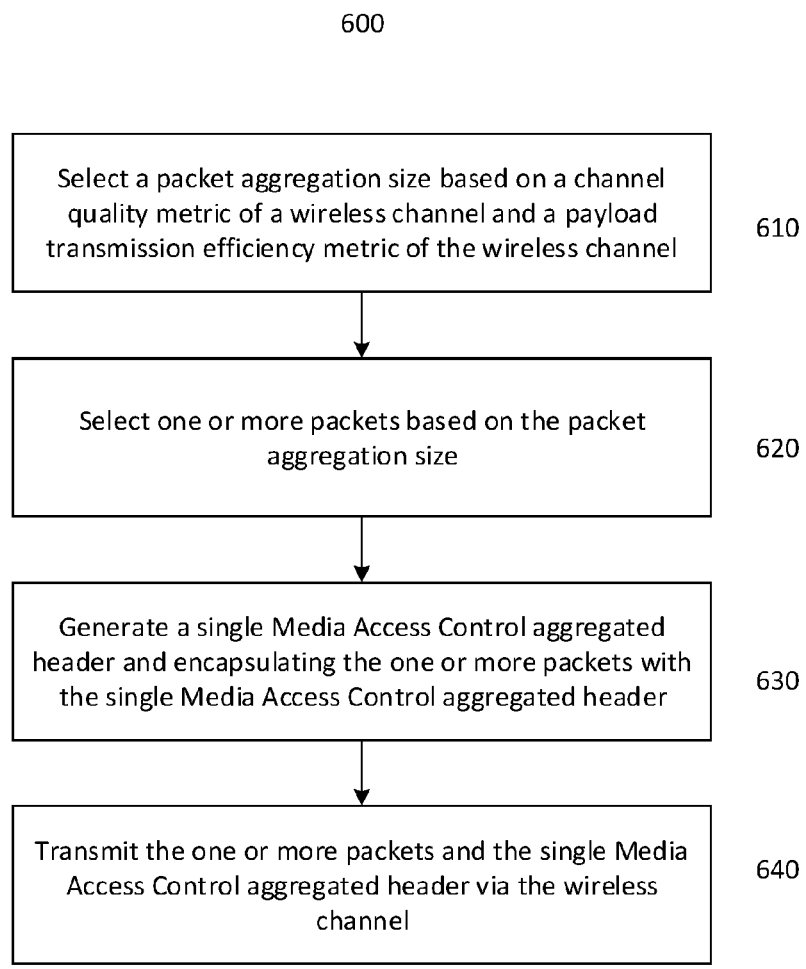
FIG. 6 shows a method for transmitting packets according to an aspect of the disclosure.

FIG. 6 shows method 600 for transmitting packets. Method 600 may include a Media Access Control process including selecting a packet aggregation size based on a channel quality metric of a wireless channel and a payload transmission efficiency metric of the wireless channel (610), selecting one or more packets based on the packet aggregation size (620), and generating a single Media Access Control aggregated header and encapsulating the one or more packets with the single Media Access Control aggregated header (630). Method 600 may further include transmitting the one or more packets and the single Media Access Control aggregated header via the wireless channel (640).

In one or more further exemplary aspects of the disclosure, one or more of the features described above in reference to FIGS. 1-5 may be further incorporated into method 600. In particular, method 600 may be configured to perform further and/or alternate processes as detailed regarding radio communication device 300.

Figure 7:
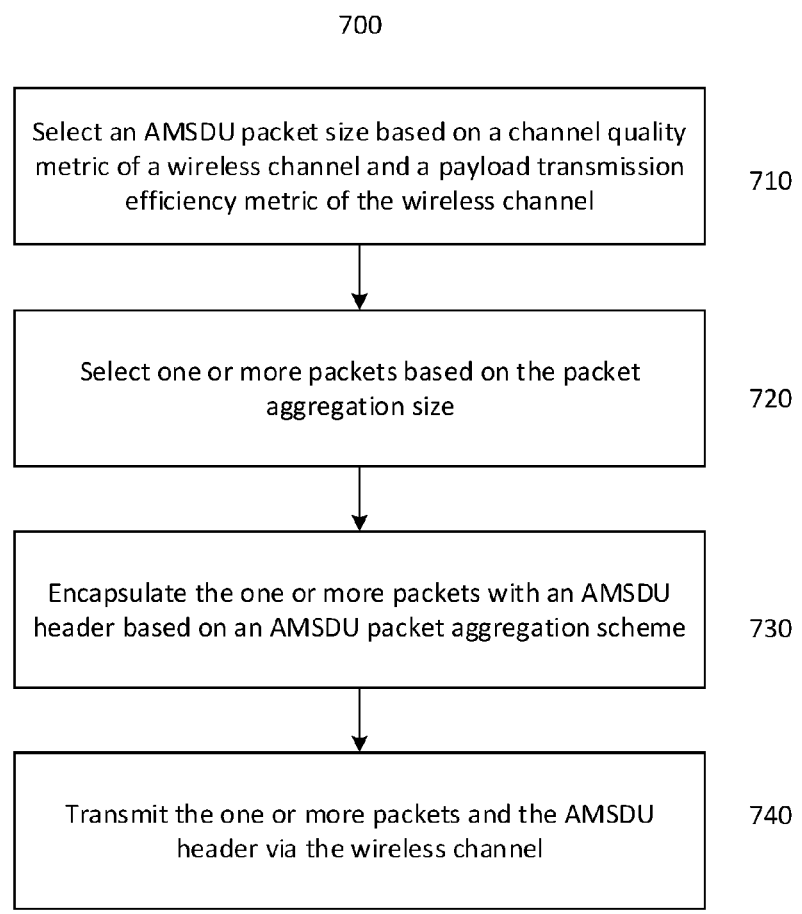
FIG. 7 shows a method for transmitting packets according to a further aspect of the disclosure.

FIG. 7 shows method 700 for transmitting Media Access Control packets. As shown in FIG. 7, method 700 includes selecting an Aggregated Media Access Control Service Data Unit (AMSDU) packet size based on a channel quality metric of a wireless channel and a payload transmission efficiency metric of the wireless channel (710), selecting one or more packets based on the packet aggregation size (720), encapsulating the one or more packets with an AMSDU header based on an AMSDU packet aggregation scheme (730), and transmitting the one or more packets and the AMSDU header via the wireless channel (740).

In one or more further exemplary aspects of the disclosure, one or more of the features described above in reference to FIGS. 1-5 may be further incorporated into method 700. In particular, method 700 may be configured to perform further and/or alternate processes as detailed regarding radio communication device 300.

The terms "user equipment", "UE", "mobile terminal", "user terminal", "mobile communication device", "terminal device", etc., may apply to any wireless communication device, including cellular phones, tablets, laptops, personal computers, wearables, multimedia playback devices, consumer/home appliances, vehicles, etc., and any number of additional electronic devices capable of wireless communications.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The following examples pertain to further aspects of the disclosure:

Example 1 is a method for transmitting packets, the method including a Media Access Control process including selecting a packet aggregation size based on a channel quality metric of a wireless channel and a payload transmission efficiency metric of the wireless channel, selecting one or more packets based on the packet aggregation size, and generating a single Media Access Control aggregated header and encapsulating the one or more packets with the single Media Access Control aggregated header, the method further including transmitting the one or more packets and the single Media Access Control aggregated header via the wireless channel.

In Example 2, the subject matter of Example 1 can optionally include wherein the transmitting the aggregated packet and the single Media Access Control aggregated header is part of a Physical Layer process.

In Example 3, the subject matter of Example 1 or 2 can optionally further include encapsulating the one or more packets and the Media Access Control aggregated header with a physical layer header, wherein the transmitting the one or more packets and the Media Access Control aggregated header via the wireless channel includes transmitting the one or more packets, the Media Access Control aggregated header, and the physical layer header via the wireless channel.

In Example 4, the subject matter of any one of Examples 1 to 3 can optionally include wherein the selecting a packet aggregation size based on a channel quality metric of a wireless channel and a payload transmission efficiency metric of the wireless channel includes selecting the packet aggregation size from a predefined plurality of packet aggregation sizes.

In Example 5, the subject matter of any one of Examples 1 to 4 can optionally include wherein the packet aggregation size represents the quantity of packets of the one or more packets.

In Example 6, the subject matter of any one of Examples 1 to 5 can optionally include wherein the selecting a packet aggregation size based on a channel quality metric of a wireless channel and a payload transmission efficiency metric of the wireless channel includes comparing the channel quality metric and the payload transmission efficiency metric to predefined criteria.

In Example 7, the subject matter of any one of Examples 1 to 5 can optionally include wherein the selecting a packet aggregation size based on a channel quality metric of a wireless channel and a payload transmission efficiency metric of the wireless channel includes comparing the channel quality metric and the payload transmission efficiency metric to a plurality of predefined criteria to identify a predefined criteria that the channel quality metric and the payload transmission efficiency metric both satisfy, and selecting the packet aggregation size based on the predefined criteria.

In Example 8, the subject matter of any one of Examples 1 to 5 can optionally include wherein the selecting a packet aggregation size based on a channel quality metric of a wireless channel and a payload transmission efficiency metric of the wireless channel includes comparing the channel quality metric to a channel quality metric threshold to obtain a first decision result that indicates whether the channel quality metric exceeds the channel quality metric threshold, comparing the payload transmission efficiency metric to a payload transmission efficiency metric to obtain a second decision result that indicates whether the payload transmission efficiency metric exceeds the payload transmission efficiency metric, and selecting the packet aggregation size based on the first decision result and the second decision result.

In Example 9, the subject matter of any one of Examples 1 to 5 can optionally include wherein the selecting a packet aggregation size based on a channel quality metric of a wireless channel and a payload transmission efficiency metric of the wireless channel includes selecting the packet aggregation size as a minimum packet aggregation size if the channel quality metric indicates that a channel quality of the wireless channel is less than a predefined channel quality threshold and the payload transmission efficiency metric indicates that a payload transmission efficiency of the wireless channel is greater than a predefined payload transmission efficiency threshold.

In Example 10, the subject matter of any one of Examples 1 to 5 can optionally include wherein the selecting a packet aggregation size based on a channel quality metric of a wireless channel and a payload transmission efficiency metric of the wireless channel includes selecting the packet aggregation size as a maximum packet aggregation size if the channel quality metric indicates that a channel quality of the wireless channel is greater than a predefined channel quality threshold and the payload transmission efficiency metric indicates that a payload transmission efficiency of the wireless channel is less than a predefined payload transmission efficiency threshold.

In Example 11, the subject matter of any one of Examples 1 to 5 can optionally include wherein the selecting a packet aggregation size based on a channel quality metric of a wireless channel and a payload transmission efficiency metric of the wireless channel includes calculating the packet aggregation size based on a predefined relationship between packet aggregation size, channel quality, and payload transmission efficiency if the channel quality metric indicates that a channel quality of the wireless channel is greater than a predefined channel quality threshold and the payload transmission efficiency metric indicates that a payload transmission efficiency of the wireless channel is less than a predefined payload transmission efficiency threshold.

In Example 2, the subject matter of Example 11 can optionally include wherein the calculating the packet aggregation size based on a predefined relationship between packet aggregation size, channel quality, and payload transmission efficiency includes calculating the packet aggregation size as a candidate packet aggregation size that maximizes the predefined relationship.

In Example 13, the subject matter of any one of Examples 1 to 5 can optionally include wherein the selecting a packet aggregation size based on a channel quality metric of a wireless channel and a payload transmission efficiency metric of the wireless channel includes selecting the packet aggregation size from a lookup table based on the channel quality metric and the payload transmission efficiency metric if the channel quality metric indicates that a channel quality of the wireless channel is greater than a predefined channel quality threshold and the payload transmission efficiency metric indicates that a payload transmission efficiency of the wireless channel is less than a predefined payload transmission efficiency threshold.

In Example 14, the subject matter of any one of Examples 1 to 13 can optionally further include assigning a single error correction check to the one or more packets.

In Example 15, the subject matter of any one of Examples 1 to 14 can optionally include wherein the generating a single Media Access Control aggregated header and encapsulating the one or more packets with the single Media Access Control aggregated header includes aggregating the one or more packets into an aggregated packet with a single error correction check.

In Example 16, the subject matter of any one of Examples 1 to 15 can optionally include wherein the channel quality metric is a packet error rate of the wireless channel or a bit error rate of the wireless channel.

In Example 17, the subject matter of any one of Examples 1 to 15 can optionally include wherein the channel quality metric is a packet error rate of the wireless channel for transmission of non-aggregated packets.

In Example 18, the subject matter of any one of Examples 1 to 17 can optionally include wherein the payload transmission efficiency metric indicates the relative payload data transmit time to the relative overhead data transmit time.

In Example 19, the subject matter of any one of Examples 1 to 18 can optionally include wherein the payload transmission efficiency metric is a physical transmission rate.

In Example 20, the subject matter of any one of Examples 1 to 18 can optionally include wherein the payload transmission efficiency metric is a ratio of payload data transmit time to overhead data transmit time.

In Example 21, the subject matter of any one of Examples 1 to 20 can optionally include wherein the Media Access Control process is an Aggregated Media Access Control (MAC) Service Data Unit (AMSDU) packet aggregation process.

In Example 22, the subject matter of any one of Examples 1 to 21 can optionally include wherein the Media Access Control process is part of a Wireless local area network protocol process.

In Example 23, the subject matter of any one of Examples 1 to 22 can optionally include wherein the one or more packets are a plurality of Wireless local area network packets.

Example 24 is a radio communication device including a wireless transmission circuit and a Media Access Control processing circuit adapted to interact with the wireless transmission circuit to transmit and receive wireless signals, the radio communication device configured to perform the method of any one of Examples 1 to 23.

In Example 25, the subject matter of Example 24 can optionally be configured as a Wireless local area network communication device.

Example 26 is a non-transitory computer readable medium storing instructions that when executed by a processor cause the processor to perform the method of any one of Examples 1 to 23.

Example 27 is a non-transitory computer readable medium storing instructions that when executed by a processor of a communication device cause the communication device to perform the method of any one of Examples 1 to 23.

Example 28 is a radio communication device including a wireless transmission circuit and a Media Access Control processing circuit adapted to interact with the wireless transmission circuit to transmit and receive wireless signals, the Media Access Control processing circuit configured to select a packet aggregation size based on a channel quality metric of a wireless channel and a payload transmission efficiency metric of the wireless channel, select one or more packets based on the packet aggregation size, and generate a single Media Access Control aggregated header and encapsulating the one or more packets with the single Media Access Control aggregated header, the wireless transmission circuit configured to transmit the one or more packets and the single Media Access Control aggregated header via the wireless channel.

In Example 29, the subject matter of Example 28 can optionally include wherein the wireless transmission circuit is configured to transmit the one or more packets and the single Media Access Control aggregated via the wireless channel as part of a Physical Layer process.

In Example 30, the subject matter of Example 28 or 29 can optionally include wherein the wireless transmission circuit includes a physical layer processing circuit configured to encapsulate the one or more packets and the Media Access Control aggregated header with a physical layer header, the wireless transmission circuit further configured to transmit the one or more packets and the single Media Access Control aggregated header via the wireless channel by transmitting the one or more packets, the Media Access Control aggregated header, and the physical layer header via the wireless channel.

In Example 31, the subject matter of any one of Examples 28 to 30 can optionally include wherein the Media Access Control processing circuit is configured to select the packet aggregation size from a predefined plurality of packet aggregation sizes.

In Example 32, the subject matter of any one of Examples 28 to 31 can optionally include wherein the packet aggregation size represents the quantity of packets of the one or more packets.

In Example 33, the subject matter of any one of Examples 28 to 32 can optionally include wherein the Media Access Control processing circuit is configured to compare the channel quality metric and the payload transmission efficiency metric to predefined criteria to select the packet aggregation size based on the channel quality metric of the wireless channel and the payload transmission efficiency metric of the wireless channel.

In Example 34, the subject matter of any one of Examples 28 to 33 can optionally include wherein the Media Access Control processing circuit is configured to select the packet aggregation size based on the channel quality metric of the wireless channel and the payload transmission efficiency metric of the wireless channel by comparing the channel quality metric and the payload transmission efficiency metric to a plurality of predefined criteria to identify a predefined criteria that the channel quality metric and the payload transmission efficiency metric both satisfy, and selecting the packet aggregation size based on the predefined criteria.

In Example 35, the subject matter of any one of Examples 28 to 33 can optionally include wherein the Media Access Control processing circuit is configured to select the packet aggregation size based on the channel quality metric of the wireless channel and the payload transmission efficiency metric of the wireless channel by comparing the channel quality metric to a channel quality metric threshold to obtain a first decision result that indicates whether the channel quality metric exceeds the channel quality metric threshold, comparing the payload transmission efficiency metric to a payload transmission efficiency metric to obtain a second decision result that indicates whether the payload transmission efficiency metric exceeds the payload transmission efficiency metric, and selecting the packet aggregation size based on the first decision result and the second decision result.

In Example 36, the subject matter of any one of Examples 28 to 33 can optionally include wherein the Media Access Control processing circuit is configured to select the packet aggregation size based on the channel quality metric of the wireless channel and the payload transmission efficiency metric of the wireless channel by selecting the packet aggregation size as a minimum packet aggregation size if the channel quality metric indicates that a channel quality of the wireless channel is less than a predefined channel quality threshold and the payload transmission efficiency metric indicates that a payload transmission efficiency of the wireless channel is greater than a predefined payload transmission efficiency threshold.

In Example 7, the subject matter of any one of Examples 28 to 33 can optionally include wherein the Media Access Control processing circuit is configured to select the packet aggregation size based on the channel quality metric of the wireless channel and the payload transmission efficiency metric of the wireless channel by selecting the packet aggregation size as a maximum packet aggregation size if the channel quality metric indicates that a channel quality of the wireless channel is greater than a predefined channel quality threshold and the payload transmission efficiency metric indicates that a payload transmission efficiency of the wireless channel is less than a predefined payload transmission efficiency threshold.

In Example 38, the subject matter of any one of Examples 28 to 33 can optionally include wherein the Media Access Control processing circuit is configured to select the packet aggregation size based on the channel quality metric of the wireless channel and the payload transmission efficiency metric of the wireless channel by calculating the packet aggregation size based on a predefined relationship between packet aggregation size, channel quality, and payload transmission efficiency if the channel quality metric indicates that a channel quality of the wireless channel is greater than a predefined channel quality threshold and the payload transmission efficiency metric indicates that a payload transmission efficiency of the wireless channel is less than a predefined payload transmission efficiency threshold.

In Example 39, the subject matter of Example 38 can optionally include wherein the Media Access Control processing circuit is configured to calculate the packet aggregation size as a candidate packet aggregation size that maximizes the predefined relationship to calculate the packet aggregation size based on a predefined relationship between packet aggregation size, channel quality, and payload transmission efficiency.

In Example 40, the subject matter of any one of Examples 28 to 33 can optionally include wherein the Media Access Control processing circuit is configured to select the packet aggregation size based on the channel quality metric of the wireless channel and the payload transmission efficiency metric of the wireless channel by selecting the packet aggregation size from a lookup table based on the channel quality metric and the payload transmission efficiency metric if the channel quality metric indicates that a channel quality of the wireless channel is greater than a predefined channel quality threshold and the payload transmission efficiency metric indicates that a payload transmission efficiency of the wireless channel is less than a predefined payload transmission efficiency threshold.

In Example 41, the subject matter of any one of Examples 28 to 40 can optionally include wherein the Media Access Control processing circuit is further configured to assign a single error correction check to the one or more packets.

In Example 42, the subject matter of any one of Examples 28 to 41 can optionally include wherein the Media Access Control processing circuit is further configured to generate the single Media Access Control aggregated header and encapsulate the one or more packets with the single Media Access Control aggregated header by aggregating the one or more packets into an aggregated packet with a single error correction check.

In Example 43, the subject matter of any one of Examples 28 to 42 can optionally include wherein the channel quality metric is a packet error rate of the wireless channel or a bit error rate of the wireless channel.

In Example 44, the subject matter of any one of Examples 28 to 42 can optionally include wherein the channel quality metric is a packet error rate of the wireless channel for transmission of non-aggregated packets.

In Example 45, the subject matter of any one of Examples 28 to 44 can optionally include wherein the payload transmission efficiency metric indicates the relative payload data transmit time to the relative overhead data transmit time.

In Example 46, the subject matter of any one of Examples 28 to 45 can optionally include wherein the payload transmission efficiency metric is a physical transmission rate.

In Example 47, the subject matter of any one of Examples 28 to 46 can optionally include wherein the payload transmission efficiency metric is a ratio of payload data transmit time to overhead data transmit time.

In Example 48, the subject matter of any one of Examples 28 to 47 can optionally include wherein the Media Access Control process is part of a Wireless local area network protocol process.

In Example 49, the subject matter of any one of Examples 28 to 48 can optionally include wherein the one or more packets are a plurality of Wireless local area network packets.

In Example 50, the subject matter of any one of Examples 28 to 49 can optionally be configured as a Wireless local area network communication device.

Example 51 is a method for transmitting Media Access Control packets, the method including selecting an Aggregated Media Access Control Service Data Unit (AMSDU) packet size based on a channel quality metric of a wireless channel and a payload transmission efficiency metric of the wireless channel, selecting one or more packets based on the packet aggregation size, encapsulating the one or more packets with an AMSDU header based on an AMSDU packet aggregation scheme, and transmitting the one or more packets and the AMSDU header via the wireless channel.

In Example 52, the subject matter of Example 51 can optionally further include encapsulating the one or more packets and the AMSDU header with a physical layer header, wherein the transmitting the one or more packets and the AMSDU header via the wireless channel includes transmitting the one or more packets, the AMSDU header, and the physical layer header via the wireless channel.

In Example 53, the subject matter of Example 51 or 52 can optionally include wherein the selecting an AMSDU packet size based on a channel quality metric of a wireless channel and a payload transmission efficiency metric of the wireless channel includes selecting the AMSDU packet size from a predefined plurality of AMSDU packet sizes.

In Example 54, the subject matter of any one of Examples 51 to 53 can optionally include wherein the AMSDU packet size represents the quantity of packets of the one or more packets.

In Example 55, the subject matter of any one of Examples 51 to 54 can optionally include wherein the selecting an AMSDU packet size based on a channel quality metric of a wireless channel and a payload transmission efficiency metric of the wireless channel includes comparing the channel quality metric and the payload transmission efficiency metric to predefined criteria.

In Example 56, the subject matter of any one of Examples 51 to 54 can optionally include wherein the selecting an AMSDU packet size based on a channel quality metric of a wireless channel and a payload transmission efficiency metric of the wireless channel includes comparing the channel quality metric and the payload transmission efficiency metric to a plurality of predefined criteria to identify a predefined criteria that the channel quality metric and the payload transmission efficiency metric both satisfy, and selecting the AMSDU packet size based on the predefined criteria.

In Example 57, the subject matter of any one of Examples 51 to 54 can optionally include wherein the selecting an AMSDU packet size based on a channel quality metric of a wireless channel and a payload transmission efficiency metric of the wireless channel includes comparing the channel quality metric to a channel quality metric threshold to obtain a first decision result that indicates whether the channel quality metric exceeds the channel quality metric threshold, comparing the payload transmission efficiency metric to a payload transmission efficiency metric to obtain a second decision result that indicates whether the payload transmission efficiency metric exceeds the payload transmission efficiency metric, and selecting the packet aggregation size based on the first decision result and the second decision result.

In Example 58, the subject matter of any one of Examples 51 to 54 can optionally include wherein the selecting an AMSDU packet size based on a channel quality metric of a wireless channel and a payload transmission efficiency metric of the wireless channel includes selecting the AMSDU packet size as a minimum AMSDU packet size if the channel quality metric indicates that a channel quality of the wireless channel is less than a predefined channel quality threshold and the payload transmission efficiency metric indicates that a payload transmission efficiency of the wireless channel is greater than a predefined payload transmission efficiency threshold.

In Example 59, the subject matter of any one of Examples 51 to 54 can optionally include wherein the selecting an AMSDU packet size based on a channel quality metric of a wireless channel and a payload transmission efficiency metric of the wireless channel includes selecting the AMSDU packet size as a maximum AMSDU packet size if the channel quality metric indicates that a channel quality of the wireless channel is greater than a predefined channel quality threshold and the payload transmission efficiency metric indicates that a payload transmission efficiency of the wireless channel is less than a predefined payload transmission efficiency threshold.

In Example 60, the subject matter of any one of Examples 51 to 54 can optionally include wherein the selecting an AMSDU packet size based on a channel quality metric of a wireless channel and a payload transmission efficiency metric of the wireless channel includes calculating the AMSDU packet size based on a predefined relationship between packet aggregation size, channel quality, and payload transmission efficiency if the channel quality metric indicates that a channel quality of the wireless channel is greater than a predefined channel quality threshold and the payload transmission efficiency metric indicates that a payload transmission efficiency of the wireless channel is less than a predefined payload transmission efficiency threshold.

In Example 61, the subject matter of Example 60 can optionally include wherein the calculating the AMSDU packet size based on a predefined relationship between packet aggregation size, channel quality, and payload transmission efficiency includes calculating the AMSDU packet size as a candidate AMSDU packet size that maximizes the predefined relationship.

In Example 62, the subject matter of any one of Examples 51 to 54 can optionally include wherein the selecting an AMSDU packet size based on a channel quality metric of a wireless channel and a payload transmission efficiency metric of the wireless channel includes selecting the AMSDU packet size from a lookup table based on the channel quality metric and the payload transmission efficiency metric if the channel quality metric indicates that a channel quality of the wireless channel is greater than a predefined channel quality threshold and the payload transmission efficiency metric indicates that a payload transmission efficiency of the wireless channel is less than a predefined payload transmission efficiency threshold.

In Example 63, the subject matter of any one of Examples 51 to 62 can optionally further include assigning a single error correction check to the one or more packets.

In Example 64, the subject matter of any one of Examples 51 to 63 can optionally include wherein the encapsulating the one or more packets with an AMSDU header based on an AMSDU packet aggregation scheme includes aggregating the one or more packets into an AMSDU packet with a single error correction check.

In Example 65, the subject matter of any one of Examples 51 to 64 can optionally include wherein the channel quality metric is a packet error rate of the wireless channel or a bit error rate of the wireless channel.

In Example 66, the subject matter of any one of Examples 51 to 64 can optionally include wherein the channel quality metric is a packet error rate of the wireless channel for transmission of non-aggregated packets.

In Example 67, the subject matter of any one of Examples 51 to 66 can optionally include wherein the payload transmission efficiency metric indicates the relative payload data transmit time to the relative overhead data transmit time.

In Example 68, the subject matter of any one of Examples 51 to 67 can optionally include wherein the payload transmission efficiency metric is a physical transmission rate.

In Example 69, the subject matter of any one of Examples 51 to 67 can optionally include wherein the payload transmission efficiency metric is a ratio of payload data transmit time to overhead data transmit time.

In Example 70, the subject matter of any one of Examples 51 to 69 can optionally include wherein the one or more packets are a plurality of Wireless local area network packets.

Example 71 is a radio communication device including a wireless transmission circuit and a Media Access Control processing circuit adapted to interact with the wireless transmission circuit to transmit and receive wireless signals, the radio communication device configured to perform the method of any one of Examples 49 to 70.

In Example 72, the subject matter of Example 71 can optionally be configured as a Wireless local area network communication device.

Example 73 is a non-transitory computer readable medium storing instructions that when executed by a processor cause the processor to perform the method of any one of Examples 49 to 70.

Example 74 is a non-transitory computer readable medium storing instructions that when executed by a processor of a communication device cause the communication device to perform the method of any one of Examples 49 to 70.

Example 75 is a radio communication device including a wireless transmission circuit and a Media Access Control processing circuit adapted to interact with the wireless transmission circuit to transmit and receive wireless signals, the Media Access Control processing circuit configured to select an Aggregated Media Access Control Service Data Unit (AMSDU) packet size based on a channel quality metric of a wireless channel and a payload transmission efficiency metric of the wireless channel, select one or more packets based on the packet aggregation size, and encapsulate the one or more packets with an AMSDU header based on an AMSDU packet aggregation scheme, the wireless transmission circuit configured to transmit the one or more packets and the AMSDU header via the wireless channel.

In Example 76, the subject matter of Example 75 can optionally include wherein the wireless transmission circuit is configured to transmit the one or more packets and the AMSDU header via the wireless channel as part of a Physical Layer process.

In Example 77, the subject matter of Example 75 or 76 can optionally include wherein the wireless transmission circuit is includes a physical layer processing circuit configured to encapsulate the one or more packets and the AMSDU header with a physical layer header, the wireless transmission further configured to transmit the one or more packets and the AMSDU header via the wireless channel by transmitting the one or more packets, the AMSDU header, and the physical layer header via the wireless channel.

In Example 78, the subject matter of any one of Examples 75 to 77 can optionally include wherein the Media Access Control processing circuit is configured to select the AMSDU packet size from a predefined plurality of AMSDU packet sizes.

In Example 79, the subject matter of any one of Examples 75 to 78 can optionally include wherein the AMSDU packet size represents the quantity of packets of the one or more packets.

In Example 80, the subject matter of any one of Examples 75 to 79 can optionally include wherein the Media Access Control processing circuit is configured to compare the channel quality metric and the payload transmission efficiency metric to predefined criteria to select the AMSDU packet size based on the channel quality metric of the wireless channel and the payload transmission efficiency metric of the wireless channel.

In Example 81, the subject matter of any one of Examples 75 to 79 can optionally include wherein the Media Access Control processing circuit is configured to select the AMSDU packet size based on the channel quality metric of the wireless channel and the payload transmission efficiency metric of the wireless channel by comparing the channel quality metric and the payload transmission efficiency metric to a plurality of predefined criteria to identify a predefined criteria that the channel quality metric and the payload transmission efficiency metric both satisfy, and selecting the AMSDU packet size based on the predefined criteria.

In Example 82, the subject matter of any one of Examples 75 to 79 can optionally include wherein the Media Access Control processing circuit is configured to select the AMSDU packet size based on the channel quality metric of the wireless channel and the payload transmission efficiency metric of the wireless channel by comparing the channel quality metric to a channel quality metric threshold to obtain a first decision result that indicates whether the channel quality metric exceeds the channel quality metric threshold, comparing the payload transmission efficiency metric to a payload transmission efficiency metric to obtain a second decision result that indicates whether the payload transmission efficiency metric exceeds the payload transmission efficiency metric, and selecting the packet aggregation size based on the first decision result and the second decision result.

In Example 83, the subject matter of any one of Examples 75 to 79 can optionally include wherein the Media Access Control processing circuit is configured to select the AMSDU packet size based on the channel quality metric of the wireless channel and the payload transmission efficiency metric of the wireless channel by selecting the AMSDU packet size as a minimum AMSDU packet size if the channel quality metric indicates that a channel quality of the wireless channel is less than a predefined channel quality threshold and the payload transmission efficiency metric indicates that a payload transmission efficiency of the wireless channel is greater than a predefined payload transmission efficiency threshold.

In Example 84, the subject matter of any one of Examples 75 to 79 can optionally include wherein the Media Access Control processing circuit is configured to select the AMSDU packet size based on the channel quality metric of the wireless channel and the payload transmission efficiency metric of the wireless channel by selecting the AMSDU packet size as a maximum AMSDU packet size if the channel quality metric indicates that a channel quality of the wireless channel is greater than a predefined channel quality threshold and the payload transmission efficiency metric indicates that a payload transmission efficiency of the wireless channel is less than a predefined payload transmission efficiency threshold.

In Example 85, the subject matter of any one of Examples 75 to 79 can optionally include wherein the Media Access Control processing circuit is configured to select the AMSDU packet size based on the channel quality metric of the wireless channel and the payload transmission efficiency metric of the wireless channel by calculating the AMSDU packet size based on a predefined relationship between packet aggregation size, channel quality, and payload transmission efficiency if the channel quality metric indicates that a channel quality of the wireless channel is greater than a predefined channel quality threshold and the payload transmission efficiency metric indicates that a payload transmission efficiency of the wireless channel is less than a predefined payload transmission efficiency threshold.

In Example 86, the subject matter of Example 85 can optionally include wherein the Media Access Control processing circuit is configured calculate the AMSDU packet size based on the predefined relationship between packet aggregation size, channel quality, and payload transmission efficiency by calculating the AMSDU packet size as a candidate AMSDU packet size that maximizes the predefined relationship.

In Example 87, the subject matter of any one of Examples 75 to 79 can optionally include wherein the Media Access Control processing circuit is configured to select the AMSDU packet size based on the channel quality metric of the wireless channel and the payload transmission efficiency metric of the wireless channel by selecting the AMSDU packet size from a lookup table based on the channel quality metric and the payload transmission efficiency metric if the channel quality metric indicates that a channel quality of the wireless channel is greater than a predefined channel quality threshold and the payload transmission efficiency metric indicates that a payload transmission efficiency of the wireless channel is less than a predefined payload transmission efficiency threshold.

In Example 88, the subject matter of any one of Examples 75 to 87 can optionally include wherein the Media Access Control processing circuit is further configured to assign a single error correction check to the one or more packets.

In Example 89, the subject matter of any one of Examples 75 to 88 can optionally include wherein the Media Access Control processing circuit is configured to encapsulate the one or more packets with the AMSDU header based on the AMSDU packet aggregation scheme by aggregating the one or more packets into an AMSDU packet with a single error correction check.

In Example 90, the subject matter of any one of Examples 75 to 89 can optionally include wherein the channel quality metric is a packet error rate of the wireless channel or a bit error rate of the wireless channel.

In Example 91, the subject matter of any one of Examples 75 to 89 can optionally include wherein the channel quality metric is a packet error rate of the wireless channel for transmission of non-aggregated packets.

In Example 92, the subject matter of any one of Examples 75 to 91 can optionally include wherein the payload transmission efficiency metric indicates the relative payload data transmit time to the relative overhead data transmit time.

In Example 93, the subject matter of any one of Examples 75 to 92 can optionally include wherein the payload transmission efficiency metric is a physical transmission rate.

In Example 94, the subject matter of any one of Examples 75 to 92 can optionally include wherein the payload transmission efficiency metric is a ratio of payload data transmit time to overhead data transmit time.

In Example 95, the subject matter of any one of Examples 75 to 94 can optionally include wherein the one or more packets are a plurality of Wireless local area network packets.

In Example 96, the subject matter of any one of Examples 75 to 95 can optionally be configured as a Wireless local area network communication device.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device comprising a wireless transmission circuit and a Media Access Control processing circuit adapted to interact with the wireless transmission circuit to transmit and receive wireless signals, the Media Access Control processing circuit configured to:
   compare a channel quality metric of a wireless channel to a channel quality metric threshold to obtain a first decision result that indicates whether the channel quality metric exceeds the channel quality metric threshold;
   compare a physical transmission rate of the wireless channel to a physical transmission rate threshold to obtain a second decision result that indicates whether the physical transmission rate exceeds the physical transmission rate threshold;
   select a packet aggregation size based on the first decision result and the second decision result, wherein the Media Access Control processing circuit is configured to select the packet aggregation size by calculating the packet aggregation size based on a predefined relationship between packet aggregation size, channel quality, and physical transmission rate if the channel quality metric is greater than the channel quality metric threshold and the physical transmission rate is less than the physical transmission rate threshold;
   select one or more packets based on the packet aggregation size; and
   generate a single Media Access Control aggregated header and encapsulating the one or more packets with the single Media Access Control aggregated header,
   the wireless transmission circuit configured to transmit the one or more packets and the single Media Access Control aggregated header via the wireless channel.

2. The radio communication device of claim 1, wherein the Media Access Control processing circuit is further configured to generate the single Media Access Control aggregated header and encapsulate the one or more packets with the single Media Access Control aggregated header by:
   aggregating the one or more packets into an aggregated packet with a single error correction check.

3. The radio communication device of claim 1, wherein the channel quality metric is a packet error rate of the wireless channel or a bit error rate of the wireless channel.

4. A method for transmitting packets, the method comprising:
   a Media Access Control process comprising:
   comparing a channel quality metric of a wireless channel to a channel quality metric threshold to obtain a first decision result that indicates whether the channel quality metric exceeds the channel quality metric threshold;
   comparing a physical transmission rate of the wireless channel to a physical transmission rate threshold to obtain a second decision result that indicates whether the physical transmission rate exceeds the physical transmission rate threshold;

selecting a packet aggregation size based on the first decision result and the second decision result, wherein selecting the packet aggregation size comprises calculating the packet aggregation size based on a predefined relationship between packet aggregation size, channel quality, and physical transmission rate if the channel quality metric is greater than the channel quality metric threshold and the physical transmission rate is less than the physical transmission rate threshold;

selecting one or more packets based on the packet aggregation size; and generating a single Media Access Control aggregated header and encapsulating the one or more packets with the single Media Access Control aggregated header, the method further comprising transmitting the one or more packets and the single Media Access Control aggregated header via the wireless channel.

5. The method of claim 4, wherein the selecting a packet aggregation size based on the first decision result and the second decision result comprises:

selecting the packet aggregation size from a lookup table based on the channel quality metric and the physical transmission rate if the channel quality metric is greater than the channel quality metric threshold and the physical transmission rate is less than the physical transmission rate threshold.

6. The method of claim 4, wherein the generating a single Media Access Control aggregated header and encapsulating the one or more packets with the single Media Access Control aggregated header comprises:

aggregating the one or more packets into an aggregated packet with a single error correction check.

7. The method of claim 4, wherein the channel quality metric is a packet error rate of the wireless channel or a bit error rate of the wireless channel.

8. The method of claim 4, wherein the Media Access Control process is an Aggregated Media Access Control (MAC) Service Data Unit (AMSDU) packet aggregation process.

9. A radio communication device comprising a wireless transmission circuit and a Media Access Control processing circuit adapted to interact with the wireless transmission circuit to transmit and receive wireless signals, the Media Access Control processing circuit configured to:

compare a channel quality metric of a wireless channel to a channel quality metric threshold to obtain a first decision result that indicates whether the channel quality metric exceeds the channel quality metric threshold;

compare a physical transmission rate of the wireless channel to a physical transmission rate threshold to obtain a second decision result that indicates whether the physical transmission rate exceeds the physical transmission rate threshold;

select an Aggregated Media Access Control Service Data Unit (AMSDU) packet size based on the first decision result and the second decision result, wherein the Media Access Control processing circuit is configured to calculate the AMSDU packet size based on a predefined relationship between packet aggregation size, channel quality, and physical transmission rate if the channel quality metric is greater than the channel quality metric threshold and the physical transmission rate is less than the physical transmission rate threshold;

select one or more packets based on the packet aggregation size; and encapsulate the one or more packets with an AMSDU header based on an AMSDU packet aggregation scheme, the wireless transmission circuit configured to transmit the one or more packets and the AMSDU header via the wireless channel.

10. The radio communication device of claim 9, wherein the Media Access Control processing circuit is configured to select the AMSDU packet size based on the first decision result and the second decision result by:

selecting the AMSDU packet size as a maximum AMSDU packet size if the channel quality metric is greater than channel quality metric threshold and the physical transmission rate is less than the physical transmission rate threshold.

11. The radio communication device of claim 9, wherein the channel quality metric is a packet error rate of the wireless channel or a bit error rate of the wireless channel.

* * * * *